March 10, 1970 N. LEWEN ET AL 3,500,001
METHOD TO SUPERVISE ESTABLISHING OF A CONNECTION IN A CROSSPOINT ARRANGEMENT, CENTRALLY CONTROLLED THROUGH MARKERS
Filed July 14, 1966
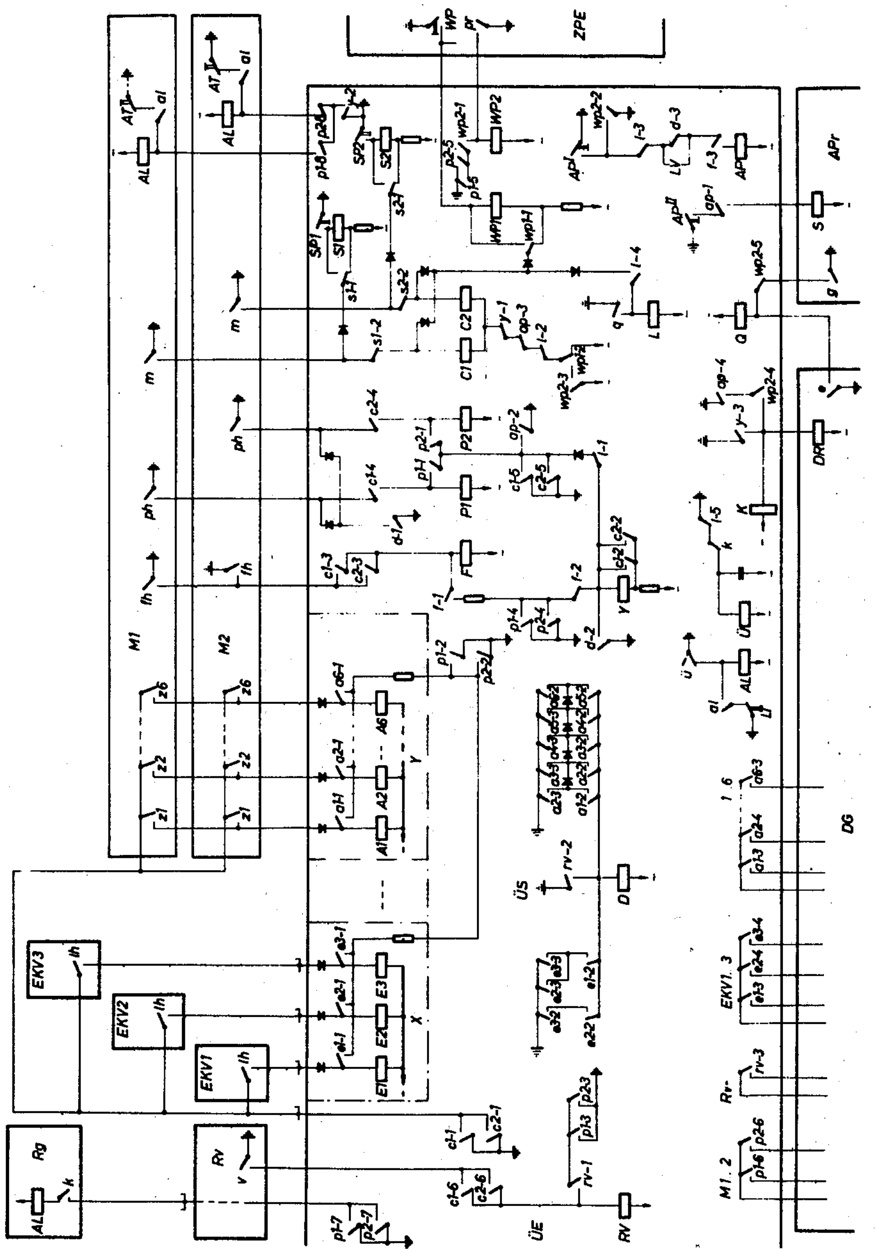

United States Patent Office 3,500,001
Patented Mar. 10, 1970

3,500,001
METHOD TO SUPERVISE ESTABLISHING OF A CONNECTION IN A CROSSPOINT ARRANGEMENT, CENTRALLY CONTROLLED THROUGH MARKERS

Nikolaus Lewen, Tamm, and Klaus Nigge, Korntal-Wurttemberg, Germany, assignors to International Standard Electric Corporation Filed July 14, 1966, Ser. No. 565,193
Claims priority, application Germany, July 17, 1965, St 24,153
Int. Cl. H04m 3/28
U.S. Cl. 179—175.2 19 Claims

ABSTRACT OF THE DISCLOSURE

A telephone switching system has a plurality of common control markers for controlling the switching network. Associated with the markers is a supervising storage facility for storing information identifying equipment being used to complete a call. Means are provided for detecting fault conditions arising during the operation of the network and means for indicating these fault conditions. Thereupon, the supervisory storage is interrogated for the identity of the possible faulty equipment. This reduces the marker holding time hitherto required to make the identification.

The invention relates to a method to supervise establishing of a connection in a crosspoint arrangement centrally controlled through markers in a telecommunication, particularly telephone exchange system in which faults are indicated in a fault indicating facility.

It is known in conventional electro-mechanical exchange systems to routine-check the individual devices or to establish testing connections to defined subscribers. If a faulty-condition is encountered in the course of this, the devices and lines participating in the establishment of this connection are blocked in order to be able to search for the fault. The work is thereby eased considerably, because the switching condition of the electro-mechanical relays, selectors and crossbar switches can be recognized without further auxiliary means.

When using modern elements, as for example relays with reed contacts or electronic elements, the switching condition cannot be observed any more with the human eye along just as little as the establishment of a centrally controlled connection, performed in the fraction of a second. Another difficulty is that the central control elements, e.g. markers, must release immediately after they have completed their function, in order to be available for the next following establishment of a connection.

The article by H. Willrett: "Massnahmen zur Sicherstellung der Zuverlässigkeit im Fernsprechvermittlungssystem HE/60 L" (measures to secure the reliability in the telephone exchange system HE/60 L) in SEL-News, 11th year of publication 1963, volume 3, pages 145 to 149, describes a method to supervise the establishment of a connection in a centrally controlled crosspoint arrangement in which at each connecting process a series of checkings is made. Irregularities thereby determined cause an alarm. At first, the marker participiating in establishing a connection is blocked, that is, all further markings are taken over by other markers associated with the crosspoint arrangement. In order to localize the fault a position interrogating device receives all data characterizing the faulty connection. From this data may be gathered which kind of fault caused the alarm and which devices and lines participated in establishing said connection. A tape perforator, used as a read-out device, punches the data contained in the position interrogating device into a paper tape, called a trouble indicating telegram.

This known method has the disadvantage that the marking device must remain blocked until the position interrogating facility has taken over all data, serving to recognize the fault.

The invention consists of a method to supervise the marker-controlled establishment of connections in a crosspoint arrangement of a telecommunication, particularly telephone exchange system, in which detected faults are indicated in a fault-indicating facility, characterized in this that a number of markers working one-at-a-time, have associated therewith in common a supervising facility storing information items during the establishment of a connection characterizing the route elements of the crosspoint arrangement participating in the establishment of said connection and characterizing the marker controlling said connection.

As in the method according to the invention the data necessary to reproduce the connecting path are already available when a possible fault occurs the marker participating in the establishment of a connection can be released immediately after its function has been completed.

The invention is now explained in detail with the aid of a circuit arrangement, shown in the accompanying drawing.

Two markers M1, M2 are indicated in this drawing, to which a supervising facility IIE is associated in common. The two markers, working on a one at a time basis, serve to control a multi-stage crosspoint arrangement, operating on the guide wire principle and used as directional grids. The crosspoint arrangement itself is not shown on the drawing, but with the contacts 1*h* in the input switching multiples of the first switching stage, indicated with EKV1, EKV2, and EKV3, the seizing contacts of these switching multiples are indicated, and the contacts *z*1 to *z*6 in the marker 1 and 2, indicate the marking contacts of the outputs of the last switching stage. For each of the mentioned input switching multiples an individual storage means is provided in the supervising facility, namely the relay E1 for the input switching multiple EKV1, the relay E2 for the input switching multiple EKV2, and the relay E3 for the input switching multiple EKV3. An individual storage means is also provided for each output of the last switching stage, namely the relays A1 to A6, for the outputs indicated by the contacts *z*1 to *z*6. The storage elements of the supervising facility, associated to the other route elements of the crosspoint arrangement are not shown on the drawing.

Such a number of route elements must be represented by the storage elements in the supervising facility, that the reproducebility of a connecting path is possible with the aid of the information items stored in these register or storage means.

As already mentioned, the crosspoint arrangement operates on the basis of the guide wire principle. If the marker, used to establish a connection in the crosspoint arrangement, e.g. the marker M1, has selected an available output of the crosspoint arrangement with the aid of the offering signal, advancing on the guide network, superimposed upon the crosspoint arrangement, and starts with the access, that is, the selection of a connecting path between an input and an output of the crosspoint arrangement, the contact *m* is closed in said marker. Thereby the relay C1 is energized in the supervising facility, if said facility is in the non-operative position. This represents the starting criterion for the supervising device which is put into operation by the response of relay C1. If the marker M2 would have been used to control the establishment of a connection the relay C2 would have responded via the closed contact *m* of said marker, and therefore the supervising facility would have been put into operation by the marker M2. Since the function of both relays C1 and C2 is equal only the function of seizing the supervising facility by the marker M1 is described. By the closed contact $c1-1$ the information items are now stored in the storage element of the supervising facility are now started. If, for example, the connecting path, to be through-connected by the marker, passes via the first input switching multiple EKV1 of the first switching stage, the contact $1h$ of said switching multiple is closed and the storage relay E1 responds. A holding circuit for this storage relay is prepared via the now closed contact $e1-1$. If the connecting path, to be through-connected, passes via the output 1 of the last switching stage, for which in each of the markers the characterizing contact $z1$ exists, said contact is now closed in the marker M1 and the storage relay A1 responds. This relay, too, prepares a holding circuit for itself via the contact $a1-1$. Route information items, either already existing or still to be expected are stored in a similar way in further storage means, not shown on the drawing. If a second busy test made on the selective output of the crosspoint arrangement had been positive, the contact $ph$ in the marker M1 would be closed and relay P1 in the supervising facility would respond via the already closed contact C1–4. (If the establishing of the connection would have been controlled by the marker M2 the contact $ph$ in said marker would have been closed and relay P2 would have been excited.) The prepared holding circuit for the relay E1 and A1 is completed via the closed contact $p1-2$.

Relay P1 holds itself via the contact $p1-1$ and the contact $c1-5$. When the connection is completely established, the marker M1 furnishes a signal to the supervising facility through closing contact $fh$, whereupon relay F responds. Relay Y was unable to respond after the response of relay P1 and prior to the response of relay F, because it is short-circuited through the contact $c1-2$. If the marker M1, having completed its function, releases and opens the contact $m$, relay C1 drops, opening the holding circuit for the relay P1 which drops and opens the holding circuit for the storage relays E1 and A1. The stored information is thus released and the supervising facility is again in the non-operative condition and will be used to supervise the next following establishment of a connection.

If, however, a marker, e.g., M1, used to establish a connection, is held up by a faulty condition after a successful second busy test relay P1 is excited. This marker, thus being unable to complete the connection is released without having closed contact $fh$. Relay C1 drops when the marker M1 is released, canceling the short-circuit of relay Y through contact $c1-2$, said relay Y can respond via the contact $p1-4$ and the not opened contact $f-2$. At the same time relay P1 is held via the same circuit. Thereby the holding circuit for the excited storage relays, e.g., E1 and A1, remains closed via contact $p1-2$. The stored information is not canceled. Contact $y-1$ opens the starting circuit of both relays C1 and C2 and the supervising facility is thereby blocked against any further seizing. Moreover, no route information occurring during the further establishment of a connection can be fed into the storage. The marker, having participated in the faulty establishment of the connection, receives an alarm via contact $y-2$, and the closed contact $p1-8$, through which alarm the relay AL in said marker responds, being held through its contact $a1$ and the closed key AT. The printing device DG used as a fault indicating device is requested via contact $y-3$, in that relay DR in said device is energized. The printing device has at its disposal information for interrogation of the participating marker through the closed contact $p1-6$ and an information on the route established up to the point of holding up via the closed contacts $e1-3$ and $a1-3$ of the storage relays E1 and A1.

If the second busy test at the selected output of the crosspoint arrangement would have been negative (relay P1 not having responded) the marker would be held up, because the connection would not be established, but this does not concern a faulty condition. Consequently, the printing device is not requested to register a fault. In this case, the relay C1 drops when the marker is released and, as relay P1 has not responded, relay Y cannot respond despite the closed contact $f-2$. The stored information items cannot be kept stored, as the holding circuit for the storage relays is not closed at contact $p1-2$. The information is cancelled and the supervising facility is used for the next following supervision.

The storage relays are concentrated into groups, corresponding to the route elements, they are associated to. The storage relays E1 to E3, associated to the input switching multiples, form the storage group X, the storage relays A1 to A6, associated to the output lines, form the storage group Y. As for a connection always only one of the route elements of the same kind is to be used, only one storage relay is allowed to respond in each storage group. If a faulty condition during the establishment of a connection occurs in such a way that e.g. the input switching multiple EKV1 as well as the input switching multiple EKV2 are seized the relays E1 and E2 respond in the storage group X. The same would occur in the storage group Y, if more than one output of the crosspoint arrangement would have been marked.

The contacts of the relays E1 to E3 and A1 to A6 form a supervising circuit US through which, in case more than one relay in a storage group is excited, relay D responds. This relay prepares with its contact $d-2$ a responding circuit for relay Y which relay responds therefore after the marker M1 has been released, thus dropping relay C1. Through the same contact $d-2$ also relay P1 is kept energized and, consequently, the holding circuit for the storage relays is maintained through contact $p1-2$. Relay F is held via contact $p1-4$. Through contact $y-3$ the printing device is requested again and said device receives all information items as described above. From the information transferred to the printing device it can be clearly gathered that the fault consists in an erroneous double marking.

As the double marking is a fault which should be registered even then, when during the establishment of a connection, the marker is held up due to a negative result of the second busy test, the relay P (in the present case the relay P1), associated to the marker concerned, is directly operated through contact $d-1$ and the closed contact $c1-4$. When the marker is released relay Y now responds via contact $d-2$ as well as via contact $p1-4$. Both contacts keep the relay P1 operative. Through the relay Y the printing device is requested again and it receives the information items contained in the storage means.

If several of the above described faulty conditions occur at the same time the processes described run down in parallel. The offering of information to the printing device corresponds to said processes.

The directional grid has a directional connector $Rv$ associated therewith. When establishing a connection to a free output leading in a defined (selected) output direction, the directional connector $Rv$ has to connect to the marker these output leads of the directional grid, which lead in this defined (and selected) output direction. The marker is thus enabled to perform a selection among these output leads only. If, due to an erroneous working, the directional connector $Rv$ connects to the marker the output leads of more than one output direction, this again is a fault which has to be registered regardless of the result of a second busy test performed by the marker. To this end a relay V (not shown in the drawing) is provided in the directional connector $Rv$, this relay being operated, if in case of a failure the directional connector connects to the marker the output leads of more than one output direction. Via its contact $v$, relay V prepares an operating circuit for relay RV of the supervising facility, this relay RV being operated via contact *c*1–6 which closes as soon as the supervising facility is seized by marker M1 (or via contact *c*2–6 closing, if the supervising facility is seized by marker M2). At contact *rv*–1 relay RV prepares a holding circuit for itself and via contact *rv*–2 it operates relay D. Relay D ensures (via contact *d*–1) the operation of relay P–1 (or relay P–2, in case of cooperation with marker M2), regardless whether the second busy test performed by marker M1 is successful or not (thus regardless whether contact *ph* in marker M1 closes or not). Through contact *p*1–3 relay P1 completes the holding circuit for relay RV. Via contact *p*1–7 and via circuits (not shown in the drawing, but indicated by the dashed line) activated in case of relay V having responded in the directional connector, the register R*g* having participated in establishing the connection and having its contact *k* closed, receives a criterion operating relay AL. This relay controls the release of register R*g* and of the connection so far established. Meanwhile, the marker M1 has already been starting to try to establish a connection. As relay D is operated, the further processes in the supervising facility run down as described above (page 7, line 29–page 8, line 25) in case of an erroneous double marking.

Regardless, whether the connection is further established to such an extent that the marker can render a completion report, or whether by the release of the register a holdup of the marker is simulated, or whether the fault register in the directional connector leads to a double marking, relay Y is energized in any case and, consequently, the printing device requested. Beside the criterion (through the closed contact *rv*–3) that this fault printing was made upon request of the directional connector, via the information stored in the storage group Y on the output concerned of the crosspoint arrangement, it can be concluded which direction has been causing the fault, in the directional connector. A wire testing device AP*r* is associated to the supervising facility. This device can be switched on or off through a key AP. The following paragraphs describe the switching process performed when the wire checking device is switched on.

If the establishment of the connection was free from faults relay AP responds via the closed key AP as soon as the relay F in the supervising facility ÜE has responded due to the marker's completion report. Contact *ap*–1 furnishes the starting signal to the wire checking device to commence checking of the wires of the through-connected route in that relay S in the wire checking device is energized. Contact *ap*–3 at the same time opens the starting lead of relay C and therewith prevents another seizing of the supervising facility. Contact *ap*–2 holds relay P1 and thus the information contained in the storage available for a possibly required printing.

If the wire checking device determines a fault on the through-connected wires, it requests the printing device in a way not shown on the drawing, and, in addition to the information stored in the supervising facility, the necessary fault identification of the respective wire is offered to the printing device.

In case of a faulty connection the wire checking facility is not started, because the starting circuit of the relay AP is interrupted in any case, either in that relay F could not respond, because the connection has not been established completely, or in that relay D was excited. But it is possible to start the wire checking device, even in case of a double marking, in that contact *d*–3 is bridged (represented by the wire LV).

After, in case of a faulty connection, the printing device has printed the information items available, it acknowledges the receipt of said information items. A relay E (not shown), indicating the end of printing, starts the acknowledging relay Q in the supervising facility. If the wire checking device is switched on, the acknowledging relay Q can also be energized, the wire checking device indicating "proper condition." This is performed by a relay G (not shown) in the wire checking device which relay indicates "proper condition." Contact *q* starts the cancelling relay L. Contact *l*–1 causes relay P1 (or relay P2, respectively) to drop and thereby the release of all relays is initiated. When the wire checking device is switched on contact *l*–3 opens the responding circuit of relay AP which interrupts the starting circuit for the wire checking facility.

In order to prevent that during the cancelling process the marker is again seized contact l–2 opens the starting circuit of relay C. At the same time relay L forms through its contact l–4 a holding circuit with the seizing wires leading to the markers. Only then, when these two seizing wires are free from potential, that means none of the contacts *m* in the markers M1, M2 is closed at the moment, relay L drops and prepares the supervising facility for another seizing. The supervising facility is now again in its non-operative position and can be operated again by closing one of the contacts *m* in one of the markers. This measure is necessary to make sure that the supervising facility does not intervene into a marking process already going on, thereby receiving incomplete information.

If for checking purposes a predetermined path is to be established through the crosspoint arrangement and this establishment is to be supervised by the supervising facility, the key WP is pulled in the centrally arranged checking facility ZPE. The thus prepared circuit of relay WP1 can be completed only if all seizing wires between the supervising facility and the markers are free from potential. By reversing the contact *wp*1–2 the starting circuit of the relays C1 and C2 is interrupted for each normal connection. It is thereby secured that the supervising facility observes and evaluates the possible establishment of a connection going on until the end and is then reserved for the checking connection. With the response of relay WP1 responds, it closes for itself a holding circuit via the seizing wires by reversing its contact, *wp*1–1. If the checking connection is performed, the characterizing relay P*r*, not shown on the drawing, responds in the central checking facility, which relay in turn operates relay WP2 and prepares through contact *wp*2–3 seizing of the supervising facility by the marker handling the checking connection. At the same time it prepares through contact *wp*2–1 a holding circuit for itself, because contact *pr* is closed only during a direct establishment of a predetermined path. In case of a checking connection the result shall be printed also when the connection is free from faults, in order to have a control, whether the route set corresponds to the predetermined route. In order to achieve this, a responding circuit for relay AP is prepared via contact *wp*2–2 and contact *wp*2–4 prepares the starting of the printing device DG. Relay AP responds after contact *f*–3 has closed, thus indicating the establishment of the connection, and through contact *ap*–4 the printing device is started. Whether the wire checking device is switched on (key AP pulled) or not, the complete path through the crosspoint arrangement is fully printed out. A possible indication "proper" of the wire checking device is ignored by the acknowledging relay Q, because contact *wp*2–5 is open. No alarm is forwarded to the marker, because contact *y*–2 is open. If at an intended connection over a predetermined path one or several faults as described above occur, relay AP is also not energized. Then the process corresponding to the fault having occurred causes printing of said fault.

The kind of fault is recognized with the aid of the printed paper slip. If the marker cannot perform a second busy test while building up a predetermined path, the printing device is not requested. Only in such case the printing is omitted and the person carrying out the checking recognizes that the checking connection through the crosspoint arrangement failed because the marker could not perform the second busy test. Only in such a case relay WP2 is switched off by the central checking device. In all other cases said relay is held through contact *p*1–5 or *p*2–5. The information items are cancelled after they have been received in the printing device as described above. When relay P drops relay WP2 drops, too. The supervising facility, however, is not automatically inserted into a gap of the seizing cycle after cancelling the information. Relay WP1 remains energized and suppresses through its contact *wp*1–2 each regular seizing of the supervising facility until the next following checking connection has been completed or until the initiated switching measure (represented through key WP) has been canceled again in the central checking device. Now the blocking relay WP1 is held energized until both seizing wires are free from potential. Thus, the supervising facility switches itself again into a seizing gap.

Through actuating the corresponding blocking keys SP1 or SP2 the supervising facility can selectively be used to supervise one marker only, in that it is blocked against seizing requests of the other marker. By pulling the key SP1, a circuit for relay S1 is prepared; but it can respond only, if the seizing wire of the marker M1 is free from potential. It is thereby again secured that the supervising facility can complete the supervision of the marker M1 just establishing a connection. With the response of relay S1 the starting circuit of relay C1 is opened through contact *s*1–2. At the same time relay S1 is connected to the corresponding seizing wires of the supervising facility through a holding circuit closed by reversal of contact *s*1–1. The supervising facility now supervises only the connections controlled by the marker M2. Unlocking is made again in such a way that blocking is automatically cancelled in a seizing gap after the corresponding key SP has been pressed, in order to secure the supervision of a complete marking process.

Relay K operates upon each printing request, starting a timing circuit (relay U) having a certain delay. If, after a defined period, the printing device has not acknowledged receipt of the information items and thereupon initiated cancelling (relay K must drop) or if the cancelling process is maintained (contact 1–5 remains opened) relay U drops, thereby starting the alarm relay AL.

Through a comparison of fault indications occurring successively—caused by the same fault—the point of trouble can be localized the more exact the more fault indications are received. For this reason the wire checking device can be disconnected. When the wire checking device is switched off more marking processes can be supervised within the same period.

What is claimed is:

1. A telephone switching system comprising means including a plurality of common control markers for controlling a network, to complete a connection through the network, means for individually enabling any of said markers one at a time, to control said network, supervising storage means associated with said markers for storing information items identifying equipment being used to complete a call, means for detecting fault conditions arising during the operation of said network, means responsive to said storage means for indicating the identification of equipment involved in said fault conditions, and means responsive to the successful completion of a call for releasing said stored information.

2. The telephone switching system of claim 1 wherein said fault indicating means comprises means responsive to the detection of a fault by said fault detecting means for recording the information items stored in said supervising storage means, and means responsive to the fault detecting means for causing said marker to give an alarm.

3. The telephone switching system of claim 2 and means responsive to the recording of said information for releasing said storage means.

4. The telephone switching system of claim 3 and means responsive to a timing means for releasing said storage means.

5. The telephone switching system of claim 1 and means for checking the wires of a through-connected path after successful completion of a call.

6. The telephone switching system of claim 5 and means responsive to the detection of a no fault condition by the wire checking means for releasing said supervising storage means.

7. The telephone switching system of claim 5 and means responsive to the detection of a fault condition by the wire checking means for forwarding to said fault indicating means the indication of a fault in said wires and said information items stored in said supervising storage means.

8. The telephone switching system of claim 1 and means for applying said information items stored in said supervising storage means to said fault indicating facility responsive to a connection being established free of fault via a predetermined path for checking purposes.

9. The telephone switching system of claim 1 and means responsive to a second busy test carried out at a selected output of a crosspoint arrangement after a failure to establish a connection for releasing said information items stored in said supervising storage means.

10. The telephone switching system of claim 9 and means for forwarding said information items to said fault indicating means responsive to the detection of a double marking of a route element in said crosspoint arrangement.

11. The telephone switching system of claim 10 and means for using said crosspoint arrangement as a directional grid, directional connector means associated to said crosspoint arrangement for connecting the output lines running in a defined output direction to said marker, means for causing a double marker alarm responsive to connection of more than one output direction through said directional connector, and means for adding information on the kind of fault to said information items forwarded to said fault indicating means.

12. The telephone switching system of claim 1 and means for operating said markers through a functional run-down without intervention by said supervising storage means during both the supervision and upon recognition of a fault.

13. The telephone switching system of claim 1 and means responsive to one of said associated markers at a defined moment of its marking process, for operating said supervising storage means when said storage means is in its non-operative position and means for releasing said supervising storage means responsive to said marker after the marking process is completed.

14. The telephone switching system of claim 13 and means for restoring said supervising storage means to its non-operative position after cancelling said stored information items therein responsive to freedom from requests by said associated markers to put said supervising storage means into operation.

15. The telephone switching system of claim 13 and switching means for preparing the establishment of a checking connection responsive to said supervising storage means returning to its non-operative position to supervise said checking connection.

16. The telephone switching system of claim 13 and switching means for blocking said supervising storage means from further operation through defined markers when said supervising storage means has returned to its non-operative position.

17. The telephone switching system of claim 1 and individual storage means in said supervising storage means which are individually associated with different route elements of a crosspoint arrangement, switching means for each of said markers for putting into operation said supervisory storage means, and switching means for indicating the arrival at defined phases in the functioning of said markers and the appearance of faulty conditions.

18. The telephone switching system of claim 17 and means for closing a responding circuit for said individual storage means individually associated with a route element responsive to one of said switching means being excited and putting into operation said supervising storage means and said route element associated with said individual storage means being involved in the connection to be established.

19. The telephone switching system of claim 18 and switching means responsive to release of said supervisory storage means and to completion of the marking process of a marker for closing or interrupting a holding circuit common to all said individual storage means to indicate the arrival at defined phases in the function of the marker and to indicate the occurrence of defined faulty conditions.

References Cited

UNITED STATES PATENTS

| | | | |
|---|---|---|---|
| 2,873,322 | 2/1959 | Vigren | 179—175.2 |
| 2,878,328 | 3/1959 | Gohorel | 179—175.2 |
| 3,299,220 | 1/1967 | Wedmore | 179—175.2 |

KATHLEEN H. CLAFFY, Primary Examiner

W. A. HELVESTINE, Assistant Examiner

U.S. Cl. X.R.

179—175.21